United States Patent Office 3,496,322
Patented Feb. 17, 1970

---

3,496,322
ARC WELDING FLUX, ELECTRODES FOR USE THEREWITH AND METHOD OF WELDING
John Gonzalez, Willowick, Ohio, assignor to The Lincoln Electric Company, Cleveland, Ohio, a corporation of Ohio
No Drawing. Filed Mar. 21, 1967, Ser. No. 624,703
Int. Cl. B23k 9/18, 25/00, 35/22
U.S. Cl. 219—73
15 Claims

ABSTRACT OF THE DISCLOSURE

A welding flux containing aluminum oxide; oxides of zirconium or magnesium; and fluorides of calcium, sodium, aluminum or magnesium; with possible, minor inclusion of silicon.

A welding electrode useful with the above flux, containing carbon, manganese, silicon, nickel, molybdenum, and iron.

A weld metal composition, particularly useful in welding high strength, low alloy steels, containing specified amounts of carbon, manganese, silicon, nickel, and molybdenum.

A welding electrode useful with the above flux containing magnesium.

---

This invention pertains to the art of electric arc welding and more particularly to a flux composition useful in submerged arc welding, to electrodes which can be used with said flux, and to a method of welding.

The invention is particularly applicable to the welding of high strength, low alloy steels such as those known in the trade as Hy–80, Hy–100 and T–1 and will be described with particular reference thereto although the invention is not so limited. In addition, the flux, when used with other suitable electrodes, has certain characteristics which make it ideal for making high alloy hardsurfacing deposits.

Some high strength, low alloy steels are noted for their toughness, particularly at low temperatures, and consequently have been used extensively in the fabrication of cryogenic vessels and transportation equipment, especially railroad cars, surface ships and submarines. These plates and sheets of high strength, low alloy steels are most generally welded together to form fabricated structures. It is axiomatic that such welds must also possess excellent toughness at low temperatures, if the full benefits of the base steel are to be enjoyed.

The present invention relates to a development which provides welds in high strength, low alloy steels, of unusually high impact strengths, and, thereby, welds of outstanding toughness.

In accordance with one aspect of the present invention, welds having high impact strengths are produced by employing an arc welding flux of novel composition which permits the development of a weld bead of uniform assay notwithstanding wide variations in arc welding parameters, e.g., arc current, arc voltage, linear speed of welding, etc. This particular characteristic of the flux when used with suitable electrodes make it ideal for other applications such as making high alloy, hardsurfacing deposits. The service life of these deposits is directly related to the deposit hardness. This hardness level is dependent on the composition of the deposit. The ability to change welding parameters without changing the deposit analysis is a prime consideration in these applications.

In accordance with another aspect of the present invention, welds having high impact strengths are obtained by practicing a method of submerged arc welding involving a novel combination of steps.

The nature and extent to which the present invention departs from the prior art can be best understood by first considering conventional practices.

In the art of submerged arc welding, it is conventional to deposit a windrow of granular flux on the seam to be welded in advance of an electrically-energized, welding electrode which moves both longitudinally and sidewardly through the windrow. An arc between the end of the electrode and the workpiece melts off the end of the electrode, a spot on the workpiece on both sides of the weld seam and a portion of the granular flux close to the arc. The metal from the electrode commingles with the metal of the workpiece and as the electrode is moved sidewardly, a molten mass of commingled metal is left which quickly hardens under the molten flux. This molten flux then hardens and can be removed.

The traditional function of a molten flux is to exclude the atmosphere, particularly nitrogen and oxygen, from both the arc and the congealing molten weld bead. Moreover, since the molten flux is in intimate contact with the molten metal, it can function to shape the weld bead surface. To do this properly, the flux should have a freezing temperature below that of the weld bead, so that the flux remains molten while the weld bead freezes.

Conventional welding fluxes are made up of blends of ingredients, typical of which are silica, and oxides and silicates of various metals such as the alkali and alkaline earth metals, manganese, aluminum, magnesium, zirconium, and titanium. These materials usually make up the principal portion of a flux, e.g., on the order of 75–85%.

Conventional fluxes may also contain a fluoride of calcium or sodium in relatively small amounts, i.e., usually less than 10%. Further, these fluxes may contain small amounts, usually less than 10% of a metal, e.g., manganese, silicon, aluminum, titanium, either as free metals or as ferroalloys. Even at low concentration, at least a portion of these metallic ingredients will be transferred from the flux to the weld bead contributing metal or alloy to the weld bead assay. For this reason, the present invention eliminates all metals from the flux and instead relies on the electrode to add the desired quantity of alloys to the deposit. In this way, the alloy deposited is not a function of the amount of flux melted but of the electrode melted. Of course, the electrode may be in the form of a solid alloy or a steel tube with powdered alloys on the inside.

The amount of each metal or compound employed in a particular flux blend has heretofore been determined somewhat empirically. This has been true because many of the ingredients used in conventional flux blends are not stable in an arc welding environment. Consequently, it is not possible to predict with certainty the changes that will take place in the unstable ingredients nor the effects these changes will have on the properties of the weld.

For instance, at high temperatures and particularly at the melting temperature of steel or the even higher heat of the arc itself, some of the above mentioned conventional oxide ingredients have sufficiently low negative free energies that they decompose to the pure metal and oxygen. Some of the metal transfers to the weld bead and turns up either as an alloy or an impurity. In either event, the contribution to the weld bead is sometimes unwanted and also may be detrimental to the physical properties of the weld. The oxygen either escapes or combines with the metals in the workpiece or electrode or both and can effect a further unwanted change in the assay of the weld bead.

Certain oxides, such as manganese oxide, are reduced by molten iron to give a metal pickup in the weld bead and iron oxide.

Other oxides, such as $SiO_2$, and $TiO_2$, decompose to a suboxide. These suboxides are unstable and when the temperature decreases, combine with themselves to form the more stable dioxide and reject excess metal atoms into the weld bead.

It is thus apparent that many of the ingredients used in electric arc welding fluxes can inherently and undesirably change or have an effect on the chemical and/or metallurgical assays of the deposited weld bead. These changes can and frequently do adversely affect the physical properties of the weld. The extent of the change or effect on the assays of the weld bead for any given flux formulation is not predictable, because it is dependent on a number of variables including the amount of flux which is melted during the welding operation which in turn is dependent on the arc current, arc voltage, and the linear speed of the welding.

As a practical matter, it is not feasible to eliminate the variables from the welding process, as, by setting up tight procedural controls on the welding operation and then insisting that these controls be carefully followed. Welding operators are oftentimes careless and oftentimes are not aware of the need for such tight procedural controls. Aside from this, changes in the line voltage or current are matters beyond the ability of the operator to control.

One of the known procedures for welding high strength, low alloy steels, involves arc welding with an electrode which supplies the bulk of the weld metal. The composition of the weld bead, which is composed principally of the metal contributed by the electrode, need not be identical to that of the base metal, but it should possess physical properties which are adequate for the application. The prior art has experienced difficulty in meeting this criterion because, as mentioned above, conventional fluxes inherently change the assay of the weld bead, and this in turn can adversely affect the physical properties of the weld, particularly in the area of impact strength. In addition, prior art fluxes do not adequately remove oxide inclusions from the weld metal which impair impact properties.

Accordingly, there is a need for a flux suitable for use in submerged arc welding which will serve the traditional functions of a flux (i.e., exclude nitrogen and oxygen, and shape the weld bead) but will not significantly contribute to, nor promote, such undesired changes in the chemical and/or metallurgical assay of the weld bead as would adversely affect the physical properties of the weld, and will reduce the oxide inclusions to such a level as to greatly improve weld metal quality. One aspect of the present invention is directed to filling this need.

Another aspect of the present invention is to provide electrodes which when used with the above flux will result in a weld bead having a specific weld metal analysis range, such weld metal having impact properties much improved over prior art flux and electrode combinations.

The present invention also contemplates an improved welding method which overcomes all of the above referred to difficulties.

In view of the foregoing discussion, it will be apparent that the desiderata of the present invention cannot be achieved using many of the conventional flux ingredients. Thus, in accordance with the invention, a welding flux composition is provided which is free, or substantially free of conventional flux ingredients such as manganese oxide, silicon dioxide, zirconium silicate and calcium silicate. These compounds have low negative free energies at arc welding temperatures and since unstable in that environment, cannot be used as principal flux ingredients for purposes of the present invention.

Thus, in accordance with the invention, only compounds having a higher negative free energy than that of silicon dioxide and with no suboxides at arc welding temperatures are employed as the principal flux ingredients. Such compounds are the oxides of magnesium, zirconium and aluminum. These oxides are sufficiently stable in the heat of the arc and in the presence of molten metal of the workpiece so as not to significantly contribute to, nor promote, such undesired changes in the assay of the weld bead as would adversely affect the physical properties of the weld.

Unfortunately, these oxides, when melted individually or together in any proportion, have such a high freezing temperature as to be unusable as an arc welding flux. To overcome this deficiency and to improve the oxide scavenging ability of the flux, there is added as a principal ingredient, a fluoride selected from the group consisting of calcium, sodium, aluminum and magnesium fluorides.

The fluoride is employed in quantities sufficient to reduce the freezing temperature of the flux composition to below the freezing temperature of the weld bead. Unfortunately, the fluoride also has an adverse effect on the slag removing properties of the flux. This in turn can be counteracted by using the proper amount of magnesium oxide, as one of the oxide ingredients. In addition, the magnesium oxide inhibits the loss of manganese from the weld puddle.

It should be apparent at this point that the limited number of flux ingredients which will accomplish the desiderata of invention, cannot be used individually, but must be used in controlled proportions. Only in this way can the favorable characteristics of the individual ingredients by reflected in the flux composition while the unfavorable characteristics are offset.

Further improvements in the slag removing and wetting properties of the flux can be achieved by the addition of minor, and carefully controlled amounts of an inorganic silicon compound, such as silica, a silicate, or a mixture of such compounds. The amount of silicon, if included, should not exceed about 6 wt. percent of the flux composition because silicon and silicates do decompose at arc welding temperatures to form products which contribute to, and/or promote, such changes in the assay of the weld bead as would adversely affect the physical properties of the weld. However, when the concentration of silicon is no more than about 6%, its adverse effect on the physical properties of the weld bead is not significant, and more than offset by its substantial contribution to the slag removing and wetting properties of the flux.

Therefore, in accordance with one aspect of the present invention there is provided, as a composition of matter, a flux suitable for use in submerged arc welding, which does not significantly contribute to, or promote, such undesired change in the assay of the weld bead, as would adversely affect the physical properties of the weld, and which, in addition, by its use, results in weld metal with an unusually low content of oxide inclusions containing as its three principal ingredients, aluminum oxide, a compound selected from the group consisting of zirconium dioxide, and magnesium oxide, and a fluoride selected from the group consisting of calcium, sodium, aluminum and magnesium fluorides, wherein the three ingredients are present in relative amounts according to the following proportions by weight:

$$\frac{\text{aluminum oxide}}{\text{zirconium or magnesium oxides}} \text{ from about .7:1 to about 1.4:1}$$

$$\frac{\text{zirconium or magnesium oxides}}{\text{fluoride}} \text{ from about .7:1 to about 1.4:1}$$

and wherein the three ingredients comprise not less than about 70% of the flux, with the balance containing from about 0 to about 6 wt. percent silicon.

When a flux of this composition has been used, weld beads of remarkably uniform chemical composition and welds having unusually high impact values, are obtainable.

To further improve the impact properties in the weld metal, and in accordance with the present invention, when welding low alloy steels such as T–1, Hy–80, and Hy–100 with the above flux, it has been found that the ideal weld metal analysis for these type steels is as follows:

| | |
|---|---|
| C _____max__ | .08 |
| Mn _____ | .75–1.05 |
| Si _____max__ | .60 |
| Ni _____ | 1.5–2.00 |
| Mo _____max__ | .70 |

Contaminants such as sulphur, phosphorus, oxygen and nitrogen are kept as low as possible.

While all of the above ranges are important, the level of the manganese and nickel have been determined to be the most significant. It has been shown that maximum impact properties occur when the manganese content is 0.80% in the deposit. A range of 0.70–1.05% manganese can be tolerated but values outside this range result in a severe decrease in impact properties of the weld metal. In addition, a minimum of 1.50% nickel is required to obtain Charpy V-notch impact values of 50 ft. lb. or greater at −60° F. for deposits of 85,000 p.s.i. yield strength or higher. Increasing the nickel content improves the low temperature impacts considerably but results in a sharp increase in transverse weld cracking when 2.0% nickel in the deposit is exceeded. The carbon level is also important in obtaining optimum impact properties. Carbon in excess of .08% in the deposit causes a sharp decrease in impact properties with a rapid increase in crack sensitivity. All other alloys, with the exception of copper, cause a decrease in impact properties. Copper is not used, however, because nickel will give the same impact results and in addition increase the strength of the weld metal. To further increase the strength level to that required, it is necessary to add molybdenum. Silicon is also added as a killing agent and ferrite strengthener.

In accordance with a further aspect of the present invention, there is provided a method of arc welding high strength, low alloy steel, which comprises the steps of: depositing on the portions of the steel to be welded, a flux composed of ingredients which do not significantly contribute to nor promote such undesired changes in the assay of the weld bead as would adversely affect the physical properties of the weld and is able to reduce the oxide inclusions in the weld metal; striking an arc between the portions of the steel to be welded and a special alloy-containing electrode; and depositing a weld bead of a given range of composition which produces a weld of unusually high impact strength.

Therefore, a principal object of the present invention is the obtainment of welds in high strength, low alloy steels, having physical properties appreciably better than heretofore obtainable with submerged arc welding.

A further object of the present invention is the obtainment of welds in high strength, low alloy steels, having unusually high impact strengths.

Another object of the present invention is the provision of a new and improved welding flux composition useful in submerged arc welding, which does not significantly contribute to, nor promote, such undesired changes in the chemical and/or metallurgical assay of the weld bead, as would adversely affect the physical properties of the weld.

Yet another object of the invention is the provision of a new and improved composition for a welding flux which does not cause or promote variations in the weld bead assay over wide variations of welding operating parameters.

Another object of the invention is a new and improved welding flux which reduces the oxide inclusions in the weld metal to such a value as to significantly improve the physical properties of the weld metal.

Another object of the invention is the achievement of an ideal range of weld metal analyses for welding low alloy steels such as T–1, Hy–80 and Hy–100 with the flux of the present invention which results in improved physical properties.

Another object of the invention is the pairing of specific electrodes with the flux of the present invention when welding low alloy steels which results in improved physical properties.

Another object of the invention is the provision of a new and improved welding method which enables the obtainment of welds having much higher impact values particularly at low temperatures, than heretofore obtained.

These and other objects and advantages will become apparent from the following detailed description of the invention, including the working example which reflect the best mode presently contemplated for carrying out the invention.

As described above, one aspect of the present invention concerns a novel welding flux composition containing, as principal ingredients, aluminum oxide, a compound selected from the group consisting of zirconium dioxide and magnesium oxide, and a fluoride, with the balance of the composition containing from about 0 to not more than about 6% silicon.

Virtually any substantially pure, anhydrous alumina may be employed as the aluminum oxide ingredient. A preferred alumina is one which has been freed of phosphorus, since this impurity, as is known, is detrimental to the physical properties of steel.

The magnesium oxide ingredient may be calcined magnesite, but is preferably dead burned magnesite, the latter having fewer impurities.

The silicon ingredient may be present as silicon dioxide, preferably quartz, or as a silicate of aluminum, magnesium, calcium or zirconium.

If a binder is used, to form agglomerates of flux particles, as will presently be detailed, all or part of the silicon may be present as sodium silicate. In this event the sodium-containing decomposition product will volatilize at arc welding temperatures, thereby leaving the vicinity of the weld bead rather than contaminating it.

The various flux ingredients may be combined in a number of different ways in accordance with the invention. They may all be finely ground, mixed together and heated to a temperature above the fusing temperature of all, allowed to cool and harden and then the hardened mass ground to the desired granule size.

Alternatively, and preferably because of simplicity and low cost, all of the flux ingredients are finely ground and thoroughly mixed with sodium silicate. This mixture is then heated with tumbling until the sodium silicate is hardened and binds the other ingredients forming large chunks of material. The chunks can then be ground to desired size producing agglomerates of flux particles bonded together with insolubilized sodium silicate.

It is to be noted that the use of the sodium silicate binder results in the presence of an additional small amount of $SiO_2$ in the flux which will result in a slight silicon pickup in the weld metal. The amount picked up, however, is sufficiently small that it is not harmful to the desired end result and it does allow for an easier and less costly binding of the flux ingredients together.

EXAMPLE I

The following ingredients in approximately the proportions indicated, all finely ground except for the last mentioned, were added to a rotary kiln:

| | Wt. percent |
|---|---|
| $Al_2O_3$ | 25.1 |
| $CaF_2$ | 26.5 |
| MgO | 32.4 |
| Sodium silicate solution (43% solids) | 16 |

The kiln was rotated with heating at about 800° C. for a length of time sufficient to thoroughly mix the ingredients and form them into large chunks, with insolubilized sodium silicate as a binder.

The chunks were removed from the kiln, ground and then screened. The material less than 14 mesh and larger than 100 mesh was recovered as product, and consisted of agglomerates of flux particles, bonded together with sodium silicate.

Even with the sodium silicate binder, which contains only 2.38% silicon, based on the weight of flux material treated, this flux composition will not significantly contribute to, nor promote, such undesired changes in the assay of a weld bead as would adversely affect the physical properties of the weld. The flux will not cause variations in the weld bead assay even if the welding parameters vary widely. Moreover, the balanced proportions of principal ingredients are such that the flux functions very well in terms of its ability to exclude oxygen and nitrogen from the weld, and freeze at a low enough temperature.

EXAMPLE II

The procedure described in Example I was repeated but with the following approximate composition:

| | Wt. percent |
|---|---|
| $Al_2O_3$ | 21.7 |
| $CaF_2$ | 23 |
| MgO | 29 |
| $ZrSiO_4$ | 5 |
| $SiO_2$ | 5.3 |
| Sodium silicate solution (43% solids) | 16 |

This composition contains silicon in the form of silica, zirconium silicate and sodium silicate, however, the total silicon content based on the flux material treated is only about 5.53%. This is less than the amount of silicon which would produce a significant, adverse effect, on the physical properties of the weld. The flux will not cause variations in the weld bead assay even if the welding parameters vary widely.

The slightly increased amount of silicon in this flux, as compared to the flux of Example I, provides an improvement in slag removing and wetting characteristics. In addition, the presence of a minor proportion of zirconium silicate gives the weld bead an esthetically pleasing, shiny appearance.

Moreover, the balanced concentrations of ingredients is such that the flux functions very well in terms of its ability to exclude nitrogen and oxygen from the weld, freeze at a low enough temperature, and its slag removal and wetting properties.

The efficacy of the present invention is illustrated by the following comparative test consisting of two runs. In both runs, pieces of one inch thick T-1 steel were welded together in accordance with the identical submerged arc welding parameters, and using the identical commercial electrode. Only the fluxes differed. In one run, the flux described in Example II, above, was used, and in the other run a commercially available flux was used.

The plate analysis of the T-1 steel was as follows:

| | |
|---|---|
| C | .15 |
| Mn | .80 |
| Si | .25 |
| Ni | .85 |
| Mo | .50 |
| Cr | .52 |
| Cu | .32 |
| V | .05 |
| B | .004 |
| S | .04 |
| P | .04 |

The electrode was a commercially available 5/32" diameter electrode having the following analysis:

| | |
|---|---|
| C | .128 |
| Mn | 1.89 |
| Si | .04 |
| Ni | 2.62 |
| Mo | .45 |
| Cr | .31 |
| Cu | .50 |
| S | .006 |
| P | .003 |

The welding parameters were as follows:

| | | |
|---|---|---|
| Power | | DC+ |
| Current | a | 500 |
| Arc voltage | v | 30 |
| Welding speed | | 20"/min |

The welds were stress relieved at 1100° F., and then subjected to the Charpy V-notch impact test with the following results:

| | Charpy V Impact properties (foot-pounds), temperature,° F. | | |
|---|---|---|---|
| Run No. | Room | 0 | −60 |
| 1 | 56 | 50 | 30 |
| 2 | 37 | 26 | 18 |

These data confirm that the use of a novel flux and welding method in accordance with the present invention, produces a weld, in a high strength, low alloy steel having impact properties significantly higher than those obtainable using a flux and welding method representative of the prior art.

The following tests illustrate another important aspect of the present invention; namely, that the improved flux composition disclosed herein, does not cause or promote significant variations in the weld bead assay, over wide variations of welding operating parameters. In addition, the flux does not significantly increase the total alloy in the deposit over that in the alloy wire. This is important in order to avoid weld cracking due to high alloy build up in the weld at high voltages.

In a first test, the flux of Example II was compared with a conventional flux at two arc voltages. The plate, electrode and the other welding parameters were held constant throughout.

The welding parameters were as follows:

| | | |
|---|---|---|
| Power | | DC+ |
| Current | a | 500 |
| Arc voltage | v | 28 and 35 |
| Welding speed | | 20"/min. |

The composition of the electrode, and the weld bead assays for the two fluxes, at each of the two arc voltages are reported below.

TABLE I

| Flux | Volts | C | Mn | Si | S | P |
|---|---|---|---|---|---|---|
| Electrode (5/32") | | .117 | 1.04 | .60 | .021 | .006 |
| Conventional | 28 | .058 | 1.59 | .80 | .018 | .018 |
| Example II | 28 | .085 | 0.77 | .42 | .015 | .007 |
| Conventional | 35 | .067 | 1.74 | .87 | .018 | .023 |
| Example II | 35 | .086 | 0.70 | .36 | .014 | .008 |

These data show, over-all, considerably less variance in the weld bead assay between the 28 and 35 volt runs where the flux of the present invention was employed, as compared with the variance obtained where a conventional flux was used.

A second test was made, following identically the format of the first test, but using an electrode having a different composition.

The composition of the electrode, and the weld bead assays for the two fluxes, at each of the two arc voltages are reported below:

TABLE II

| Flux | Volts | C | Mn | Si | Cr | Ni | S | P |
|---|---|---|---|---|---|---|---|---|
| Electrode (5/32") | | .051 | 1.64 | .29 | 21.29 | 10.16 | .011 | .011 |
| Conventional | 28 | .053 | 1.87 | .68 | 20.28 | 9.99 | .015 | .018 |
| Example II | 28 | .042 | 1.43 | .41 | 20.62 | 10.08 | .008 | .014 |
| Conventional | 35 | .051 | 1.92 | .79 | 19.82 | 9.97 | .016 | .023 |
| Example II | 35 | .043 | 1.37 | .44 | 20.60 | 10.15 | .008 | .015 |

Here again, these data show considerably less variance in the weld bead assay, between the 28 and 35 volt runs, where the flux of the present invention was employed, as compared with the variance obtained where a conventional flux was used.

It will be understood, of course, that a voltage variation of 7 volts is quite substantial. Yet even under these extreme conditions, the assay variations in the weld beads formed in the presence of a flux of this invention, were so small as not to produce a significant adverse effect on the physical properties of the weld.

Another aspect of the present invention concerns new welding electrodes, which, when used with the flux of the present invention, will result in weld metal which has a specific analysis and a very low content of oxide inclusions. This weld metal will have still higher impact strengths than previously described and in fact higher than any prior art electrode and flux combinations. As has been stated, yield strengths of 85,000 p.s.i. minimum with Charpy V-notch values of 50 ft. lb. or greater at −60° F. can be obtained.

In order to obtain the desired weld metal analysis, which is on a wt. percent basis:

| | | |
|---|---|---|
| C | max | .08 |
| Mn | | .75–1.05 |
| Si | max | .60 |
| Ni | | 1.5–2.0 |
| Mo | max | 0.70 |

(balance Fe) with a flux of the present invention, and produce a deposit having a yield strength of 100,000 p.s.i., an electrode of the following composition is desired (wt. percent, balance Fe):

| | |
|---|---|
| C | .07–.10 |
| Mn | 1.25–1.45 |
| Si | .50–.60 |
| Ni | 1.70–2.00 |
| Mo | .60–.70 |
| S max | .01 |
| P max | .01 |

The average weld metal analysis resulting from this electrode and the subject flux will be (wt. percent, balance Fe).

| | |
|---|---|
| C | .06 |
| Mn | 1.00 |
| Si | .40 |
| Ni | 1.87 |
| Mo | .65 |
| S | .015 |
| P | .005 |

If it is not necessary to have such a high yield strength in the weld metal, an electrode with a lower alloy content can be used which will reduce the tendency for cracking. This electrode has the following analysis (wt. percent, balance Fe) and will result in a yield strength of 90,000 p.s.i.

| | |
|---|---|
| C | .06–.09 |
| Mn | 1.0–1.2 |
| Si | .30–.40 |
| Ni | 1.70–2.00 |
| Mo | .40–.50 |
| S max | .01 |
| P max | .01 |

The average weld metal analysis with this electrode and a flux of the present invention will be (wt. percent, balance Fe).

| | |
|---|---|
| C | .05 |
| Mn | .80 |
| Si | .35 |
| Ni | 1.87 |
| Mo | .45 |
| S | .015 |
| P | .005 |

Of course, either of the above electrodes may be in the form of a solid wire or fabricated tubular electrode.

Another aspect of the present invention is the ability to use magnesium as a deoxidizer and desulfurizer. Heretofore, with prior art fluxes i.e., those using principal ingredients having negative free energies equal to or lower than silicon dioxide, it has been difficult or impossible to make use of magnesium. The reason for this was that before the magnesium could pass into the weld metal it would reduce the ingredients of the flux having lower negative free energies, resulting in free metals (such as manganese or silicon) and eliminate the magnesium as a deoxidizer and desulfurizer for the weld metal. These free metals would then go into the weld metal changing the assay of the weld metal. Using the novel flux of the present invention which contains only higher negative free energy materials as principal ingredients, the magnesium used in amounts within the range of about 0.1 to 1.5 wt. percent total electrode, can traverse the arc and effectively deoxidize and desulfurize the weld metal with little or no change in the alloy assay of the weld metal.

The incorporation of magnesium may be accomplished by any suitable procedure which does not subject the metal to temperatures at which it oxidizes rapidly. Thus, the metal may be applied as a coating on the electrode, but is preferably included as one of the ingredients in a tubular electrode. High temperature processing prevents magnesium from being incorporated in a flux.

As an example of this aspect of the invention, using a tubular electrode. High temperature processing prevents of the present invention Charpy V-notch impact properties of 74 ft.-lbs. at −60° F. are obtainable:

| | |
|---|---|
| C | .075 |
| Mn | 1.20 |
| Si | None |
| Ni | 2.0 |
| Mo | 0.45 |
| Mg | 0.80 | wt. percent total electrode, balance Fe. The weld deposit analysis using this electrode is:

| | |
|---|---|
| C | .055 |
| Mn | .90 |
| Si | .22 |
| Ni | 2.0 |
| Mo | .42 | wt. percent, balance Fe. This deposit has a yield strength of 92,000 p.s.i.

The present invention has been described in conjunction with certain illustrative examples; however, it is to be appreciated that many modifications and variations may be made in these illustrations without departing from 3,496,322 the intended scope and spirit of the present invention as defined in the appended claims.

Having thus described my invention, I claim:

1. As a composition of matter, a flux suitable for use in submerged arc welding, containing as its three principal ingredients aluminum oxide, a compound selected from the group consisting of zirconium dioxide and magnesium oxide, and a fluoride selected from the group consisting of calcium, sodium, aluminum and magnesium fluorides, said three ingredients being present in relative amounts according to the following proportions by weight:

$$\frac{\text{aluminum oxide}}{\text{said compound}} \text{ from about .7:1 to about 1.4:1}$$

$$\frac{\text{said compound}}{\text{fluoride}} \text{ from about .7:1 to about 1.4:1}$$

said three ingredients comprising not less than about 70% of said flux, with the balance containing from about 0 to about 6 wt. percent silicon, whereby said flux does not significantly contribute to, nor promote, such undesired changes in the assay of a deposited weld bead as would adversely affect the physical properties of the resulting weld.

2. The composition of matter as defined in claim 1, wherein the fluoride ingredient is calcium fluoride.

3. The composition of matter as defined in claim 1, wherein said flux is in the form of agglomerates consisting of particles bonded with sodium silicate.

4. The composition of matter as defined in claim 1, wherein at least a portion of said silicon when included, is present in the form of zirconium silicate.

5. The composition of matter as defined in claim 1, wherein said silicon, when present, is in the form of a compound selected from the group consisting of silica, silicates and mixtures thereof.

6. A flux composition suitable for use in submerged arc welding, which does not significantly contribute to, nor promote, such undesired changes in the assay of a weld bead as would adversely affect the physical properties of a weld, consisting essentially of the following ingredients in approximately the stated amounts:

| | Wt. Percent |
|---|---|
| Aluminum oxide | 21.7 |
| Calcium fluoride | 23 |
| Magnesium oxide | 29 |
| Zirconium silicate | 5 |
| Silicon dioxide | 5.3 |
| Sodium silicate | 16 |

7. The flux composition as defined in claim 6, wherein said sodium silicate is a binder for agglomerates of particles consisting of the other stated ingredients.

8. A flux composition suitable for use in submerged arc welding, which does not significantly contribute to, nor promote, such undesired changes in the assay of a weld bead as would adversely affect the physical properties of a weld, consisting essentially of the following ingredients in approximately the stated amounts:

| | Wt. Percent |
|---|---|
| Aluminum oxide | 25.1 |
| Calcium fluoride | 26.5 |
| Magnesium oxide | 32.4 |
| Sodium silicate | 16 |

9. The flux composition as defined in claim 7, wherein said sodium silicate is a binder for agglomerates of particles consisting of the other stated ingredients.

10. For use in combination with the flux composition defined in claim 1, to produce a weld metal containing by wt. percent:

| | |
|---|---|
| C | max .08 |
| Mn | .75–1.05 |
| Si | max .60 |
| Ni | 1.5–2.0 |
| Mo | max .70 |
| Fe | Balance | an electrode having the following composition by wt. percent:

| | |
|---|---|
| C | .07–.10 |
| Mn | 1.25–1.45 |
| Si | .50–.60 |
| Ni | 1.70–2.00 |
| Mo | .60–.70 |
| S | max .01 |
| P | max .01 |
| Fe | Balance |

11. For use in combination with the flux composition defined in claim 1, to produce a weld metal having an average analysis on a wt. percent basis of:

| | |
|---|---|
| C | .05 |
| Mn | .80 |
| Si | .35 |
| Ni | 1.87 |
| Mo | .45 |
| S | .015 |
| P | .005 |
| Fe | Balance | an electrode having the following composition by wt. percent:

| | |
|---|---|
| C | .06–.09 |
| Mn | 1.0–1.2 |
| Si | .30–.40 |
| Ni | 1.70–2.00 |
| Mo | .40–.50 |
| S | max .01 |
| P | max .01 |
| Fe | Balance |

12. A method of arc welding high strength, low alloy steel, which comprises the steps of: depositing on the portions of the steel to be welded, a flux containing as its three principal ingredients, aluminum oxide, a compound selected from the group consisting of zirconium dioxide, and magnesium oxide and a fluoride selected from the group consisting of calcium, sodium, aluminum and magnesium fluorides, said three ingredients being present in relative amounts according to the following proportions by weight:

$$\frac{\text{aluminum oxide}}{\text{said compound}} \text{ from about .7:1 to about 1.4:1}$$

$$\frac{\text{said compound}}{\text{fluoride}} \text{ from about .7:1 to about 1.4:1}$$

said three ingredients comprising not less than about 70% of said flux, with the balance containing from about 0 to about 6 wt. percent silicon; striking an arc between the portions of the steel to be welded and an alloy-containing electrode; and depositing a weld bead of a composition which produces a weld of unusually high impact strength.

13. The method as defined in claim 12, wherein said alloy-containing electrode has the composition as defined in claim 10.

14. The method as defined in claim 12, wherein said alloy-containing electrode has the composition as defined in claim 11.

15 For use in combination with the flux composition defined in claim 1, an electrode containing a deoxidizing and desulfurizing amount of magnesium, within the range of about 0.1 to about 1.5% weght of electrode.

References Cited

UNITED STATES PATENTS

| | | | |
|---|---|---|---|
| 1,992,792 | 2/1935 | Weed | 219—146 |
| 2,024,992 | 12/1935 | Wissler et al. | 219—76 X |
| 2,719,801 | 10/1955 | Stringham et al. | 148—26 |
| 2,977,676 | 4/1961 | Sherwin et al. | 148—23 X |
| 3,320,100 | 5/1967 | Coless | 219—73 X |
| 3,394,238 | 7/1968 | Wilcox | 219—148 X |

JOSEPH V. TRUHE, Primary Examiner

C. L. ALBRITTON, Assistant Examiner

U.S. Cl. X.R.

148—23; 219—146